United States Patent
Balko

(10) Patent No.: US 8,356,075 B2
(45) Date of Patent: Jan. 15, 2013

(54) DISTRIBUTED BUSINESS PROCESS MANAGEMENT SYSTEM WITH LOCAL RESOURCE UTILIZATION

(75) Inventor: Sören Balko, Müllheimer Talstraβe (DE)

(73) Assignee: SAP AG, Walldorf (DE)

( * ) Notice: Subject to any disclaimer, the term of this patent is extended or adjusted under 35 U.S.C. 154(b) by 204 days.

(21) Appl. No.: 12/779,605

(22) Filed: May 13, 2010

(65) Prior Publication Data

US 2011/0283284 A1 Nov. 17, 2011

(51) Int. Cl.
*G06F 15/16* (2006.01)
*G06Q 10/00* (2012.01)
*G06F 17/30* (2006.01)

(52) U.S. Cl. .................... 709/204; 705/7.11; 707/784

(58) Field of Classification Search .................... None
See application file for complete search history.

(56) References Cited

U.S. PATENT DOCUMENTS

| 7,519,976 B2* | 4/2009 | Blevins .......................... 719/328 |
| 8,185,916 B2* | 5/2012 | Toussaint et al. ............. 719/328 |
| 8,275,791 B2* | 9/2012 | Raffaele et al. ................ 707/784 |
| 2010/0057505 A1* | 3/2010 | Doyle et al. ...................... 705/7 |
| 2011/0154336 A1* | 6/2011 | Balko ............................ 718/100 |

* cited by examiner

*Primary Examiner* — Wen-Tai Lin
(74) *Attorney, Agent, or Firm* — Finnegan, Henderson, Farabow, Garrett & Dunner, LLP

(57) ABSTRACT

Systems and methods consistent with the invention may include providing an instance of business process management suite in a sandbox of a web browser. The instance of the business process management suite may be based on an archive received from a web server. The business process management suite may be controlled using a graphical user interface in a browser. Providing a business process management suite may further include creating an instance of a database management system in the sandbox. The instance of the database management system may further store its data in the local memory of a client device.

19 Claims, 10 Drawing Sheets

DISTRIBUTED BUSINESS PROCESS MANAGEMENT SYSTEM WITH LOCAL RESOURCE UTILIZATION

BACKGROUND

1. Relevant Field

Systems and methods consistent with the present invention generally relate to the management of data. More particularly, systems and methods consistent with the invention relate to providing an on demand business process management system that takes advantage of client resources.

2. Background Information

Businesses and other organizations generate and/or receive a variety of data items and electronic information (broadly referred to hereafter as "business data") during the course of their operation. The business data may be generated and/or received from various entities located in different regions and/or countries. To organize and manage operations of the organization, the organization may use various modeling languages to generate workflow models describing tasks of processes executed by the organization. These workflow models may graphically represent activities or tasks of business processes that assist non-technical and technical professionals in the implementation and execution of those processes. Models may also be used to specify ordering and conditions when certain tasks are to be performed, to specify necessary resources (e.g., employees, machinery, etc.), and to specify other interfaced entities (e.g., systems, applications, business partners, etc.).

Business process management suite (BPMS) environments may be set up as traditional "on-premise" environments that included local installations of BPMS software applications (e.g., BPMS software applications installed on hardware that is owned and maintained by the same company using the BPMS software applications) or "on-demand" offerings where a third-party service provider hosts the BPMS software applications. An on-premise installation, however, may not be appropriate in some situations. For example, an on-premise environment requires significant installation and maintenance costs, resulting in a large total cost of ownership (TCO) to the organization. The large TCO can thus make an on-premise installation unfeasible for small-scale scenarios where a customer runs only a few processes since a few number of processes may not be of sufficient value to justify the cost of an on-premise installation.

Because on-demand BPMS environments are hosted by a service provider (not the organization), they have lower TCOs. On-demand BPMS environments are able to maintain their low TCOs because their operational costs are absorbed by a third-party (e.g., a host), and the third-party can leverage the absorbed cost across customers using the same on-demand BPMS installation. As a result, on-demand environments have become increasingly popular. Still, a typical on-demand BPMS environment can also have limitations. For instance, an on-demand offering raises data privacy concerns since the organization's data is stored at the remote location of the third-party hosting the on-demand BPMS environment. Another potential drawback is that the third party can also be a bottleneck in terms of resource availability. For example, with the addition of each new client, the third-party host may need, for example, additional computing power, memory, disc space, and network bandwidth to serve the new client without impacting the performance of previous clients. In view of the above, it is desirable to provide methods and systems to provide improved business process management environment.

SUMMARY

In accordance with one embodiment of the invention, a computer-implemented method for managing a business process is disclosed. The method may include receiving a request from a client device; sending, to the client device, an archive including information for instantiating a business process management application and instantiating a database management system; sending, to the client device, front-end data including data for providing a graphical user interface for the business process management application; and providing the graphical user interface for the business process management application to be displayed by a browser of the client device.

Consistent with another embodiment of the present invention, a web server for providing an environment for managing a business process on a client device is disclosed. The web server may include a processor; a receiver for receiving a request from a client device; a transmitter for sending data to a client device over a network including front-end data and an archive, wherein the archive includes information for instantiating a business process management application and instantiating a database management system, wherein the front-end data includes data for providing a graphical user interface for the business process management application; and a memory for storing the archive and the front end data, wherein sending data to the client device causes the graphical user interface to be presented and causes the business process management application and the database management system to be instantiated in a sandbox of the client device.

In accordance with another embodiment of the present invention, a client device for providing a business process management application is disclosed. The system may include a processor; a transmitter for sending a request to a web server; a receiver for receiving an archive and a front-end from the web server; and a memory for storing instructions to execute a method, the method comprising: launching a sandbox on the client device, creating an instance of the business process management application based on the archive received from the web server, creating an instance of a database management system in the sandbox, and providing a graphical user interface for the business process management application in a browser of the client device.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
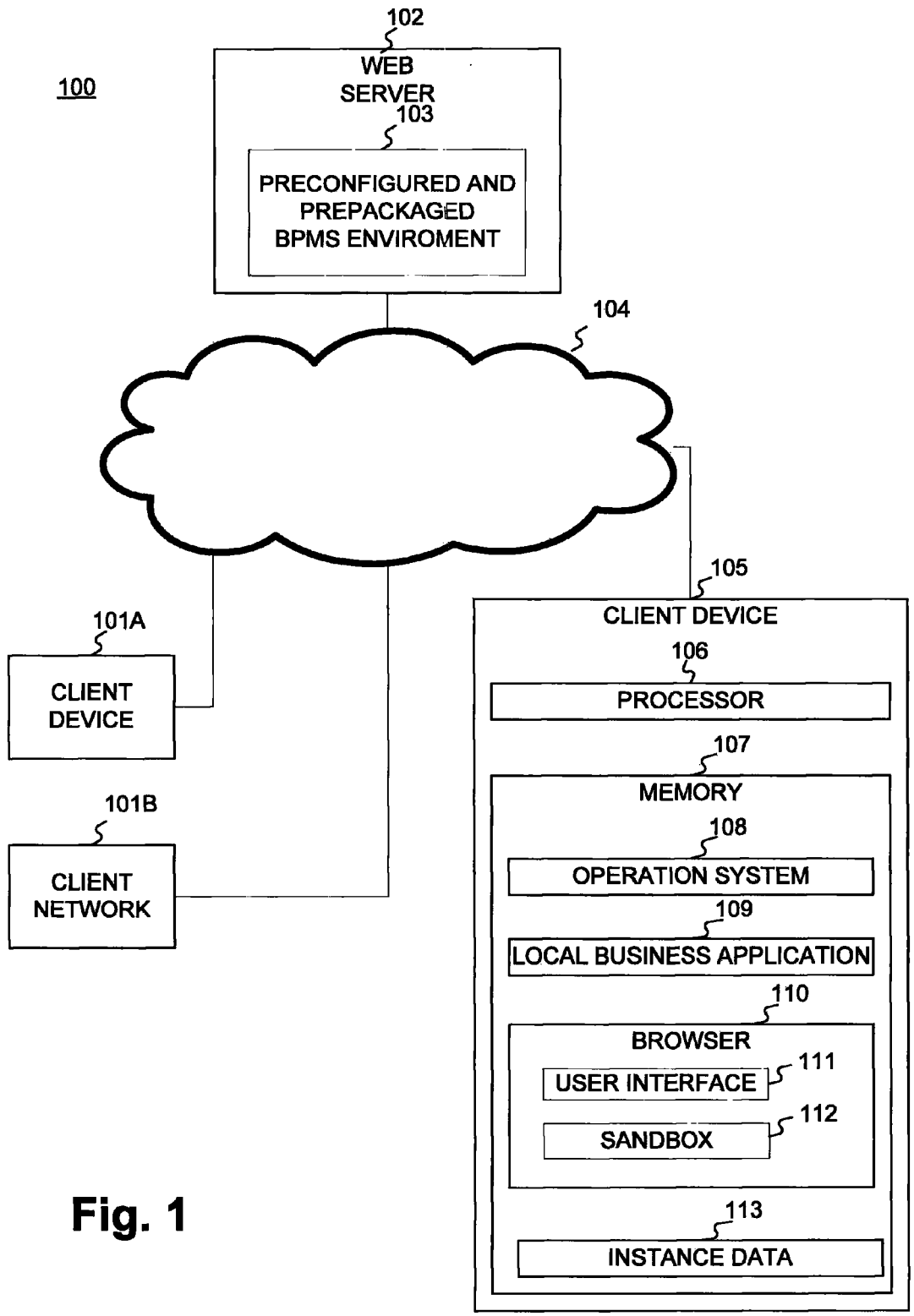
FIG. 1 illustrates an exemplary on-demand BPMS system, consistent with the present invention.

The following detailed description refers to the accompanying drawings. Wherever possible, the same reference numbers are used in the drawings and in the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the invention generally relate to the providing of a BPMS environment to a client device. These systems and method may include a web server for sending front-end data and archive data to a client device. In one implementation, the archive data may include data for instantiating a business process management application and a database management system. The front-end data, on the other hand, may include data for providing a graphical user interface for the business process management application. Upon receiving the archive data, the client device may then instantiate, in a sandbox of the client device, the business process management application and the database management system. Receiving the front-end data may also cause the client device to present a graphical user interface through which a user may interact with the business process management application in the sandbox.

As used herein, BPMS or BPMS environment broadly refers to any type of computer-implemented software, system, or tools for managing a business process. For example, a BPMS may include workflow models programmed and modeled according to a notation similar to Business Process Modeling Notation (BPMN), providing a graphical representation for specifying business processes in a workflow. Systems consistent with the invention may thus be used to provide BPMS products offered by SAP AG, such as SAP NetWeaver Business Process Management ("SAP NetWeaver BPM").

FIG. 1 depicts an exemplary BPMS system 100 for providing a BPMS environment. As shown in FIG. 1, BPMS system 100 may include a communication network 104 that facilitates communication between a web server 102 and a plurality of client devices and networks 101A-B and 105. One skilled in the art will understand that the number of components 101A-B, 102, and 105 shown in FIG. 1 are exemplary. Systems 100 consistent with the invention may thus include any number of client devices 101A or 105.

Communication network 104 may include one or more network types, such as a wide-area network (WAN), a local-area network (LAN), or the Internet. Communication network 104 may operate by wireline and/or wireless techniques and may use a transmission control protocol/internet protocol ("TCP/IP") or any other appropriate protocol to facilitate communication between web server 102 and a plurality of client devices and networks 101A-B and 105 of system 100. Network connections within network 104 may be established via Ethernet, telephone line, cellular channels, or other transmission media. Data communications over network 104 may be facilitated by transmitting data packets between devices, such as components 101A-B, 102, and 105. The data transmissions described herein may be sent, for example, in a single data packet or divided across several data packets.

Web server 102 and client devices 101A and 105 of system 100 may comprise a combination of one or more application programs and one or more hardware components. For example, application programs may include software modules, sequences of instructions, routines, data structures, display interfaces, and other types of structures that execute the disclosed operations of the present invention. The hardware components of web server 102 and/or client devices 101A, 105 may include a combination of Central Processing Units (CPUs), buses, memory devices, storage units, data processors, input devices, output devices, network interface devices, and other types of components that would be apparent to those skilled in the art. Web server 102 and/or client devices 101A and 105 may thus be implemented by any type of computer device, such as a personal computer or mainframe computer.

Web server 102 may further include software for serving web pages and/or replying to data requests from, for example, client devices 101A or 105. The client devices, such as client devices 101A and 105, served by web server 102 may be distinct. That is, each client device may have individually preconfigured and prepackaged BPMS environments stored on web server 102. Additionally, client devices 101A and 105 may leverage web server 102 instead of using their local resources (e.g., memory 107). For example, data may be stored centrally, thereby eliminating the need to persist process models of instance data 113 on client devices 101A and 105.

The web server 102 may include a processor and a memory (both not shown) for serving the pages or replying to the data requests. For example, web server 102 may be equipped with HTTP software, such as an Apache HTTP Server. Web server 102 may also maintain a preconfigured and prepackaged BPMS environment 103 for distributing to client devices 101A and 105 or client networks 101B over network 104.

Like network 104, client network 101B may include one or more network types, such as a wide-area network (WAN) and a local-area network (LAN), and connections within the network may be established via Ethernet, telephone line, cellular channels, or other transmission media. Client network 101B may also include nodes similar to client devices 101A and 105.

As illustrated in FIG. 1, client device 105 may include a processor 106 and a memory device 107. Memory device 107 may be used to store process instructions, such as those of operating system 108, which may be executed by processor 106 to cause client device 105 to implement a plurality of operations. Memory device 107 may also store instructions and/or data for implementing local business application 109 or a browser 110. Memory device 107 may include all forms of computer-readable storage mediums, such as non-volatile or volatile memories, including, by way of example, semi-conductor memory devices, such as EPROM, RAM, ROM, DRAM, EEPROM, and flash memory devices; magnetic disks, such as internal hard disks and removable disks; magneto-optical disks; and CD-ROM disks. Local business application 109 may thus be a local implementation of business process management software application corresponding to BPMS environment 103, described in more detail below. In exemplary implementations, local business application 109 may be SAP NetWeaver BPM.

FIG. 1 further illustrates that browser 110 may further include instructions for implementing a user interface 111 or a sandbox 112. The user interface 111 may provide, to a user of client device 105, an interface for interacting with software instances provided in sandbox 112. As known to those skilled in the art, a sandbox generally refers to a secure computing environment for running an instance of software application in isolation from other software programs on the device or with control restrictions on accessing client resources. In the exemplary implementation of FIG. 1, sandbox 112 may provide software instances for implementing BPMS environment 103. The software instances for implementing BPMS environment 103 may include, for example, an instance of a BPMS 301 and an instance of a DBMS 302, as discussed in more detail below with respect to FIG. 3. In exemplary implementations, sandbox 112 can be implemented using Sun Java Webstart, Google NativeClient, Microsoft ActiveX, VMWare, or other appropriate sandbox technologies. Memory 107 may further store instance data 113. Instance data 113 may include data for providing the software instance for implementing BPMS environmental 103. For example, instance data 113 may include the data context, the progress, task processors and other role data for the BPMS environment 103.

Although the exemplary embodiment of system 100 is described as having particular components arranged in a particular manner, one skilled in the art will appreciate that system 100 may include additional or fewer components that may be arranged differently. For example, client devices 101A and 105 and web server 102 may include additional processors and/or memory devices. Further, the process instructions included in, for example, components 108, 109, and 110, may be distributed across multiple memory devices. And as stated above, system 100 may be implemented with fewer or more client devices 101A, 105 than shown in FIG. 1. For instance, clients, such as client devices 101A and 105, may leave or join system 100 without impacting the service to other clients and without the need to add significant processing resources to web server 102.

Figure 2:
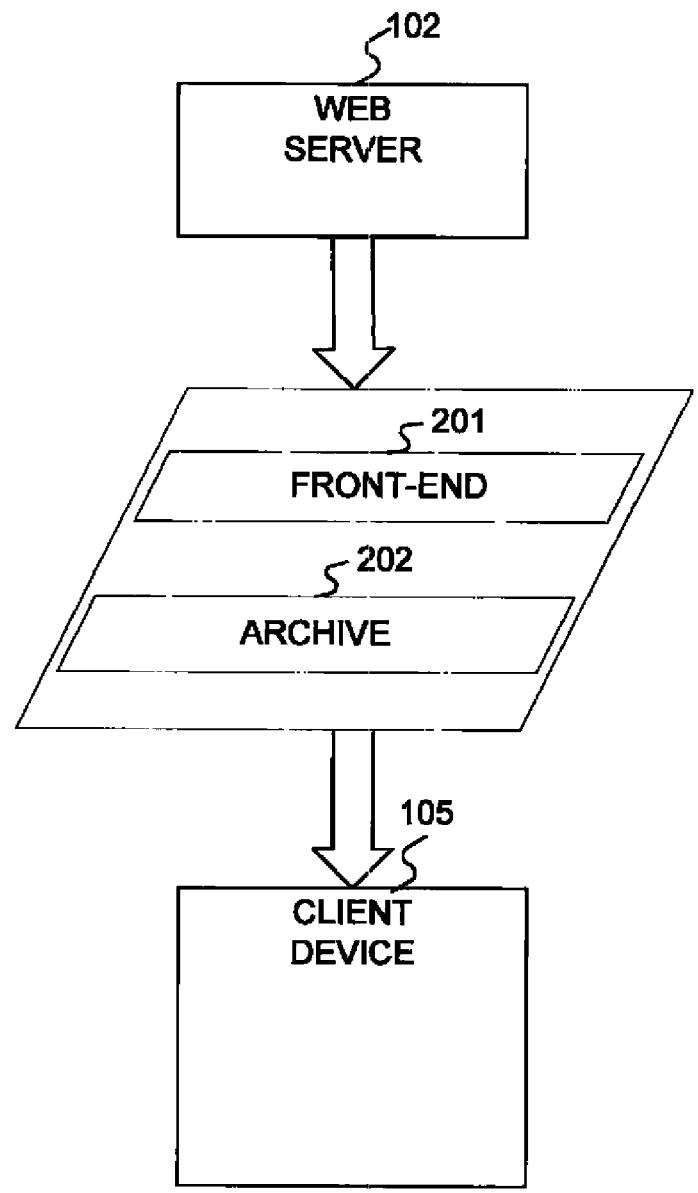
FIG. 2 illustrates an exemplary transfer of information from a web server to a client device, consistent with the present invention.

As generally illustrated in FIG. 2, web server 102 may transmit information to client device 105. For example, in implementations consistent with the invention, web server 102 may transmit front-end data 201 and archive data 202 to client device 105. Front-end data 201 may include information for presenting a graphical user interface (GUI) to a user via a display device (not shown). Front-end data 201 may thus correspond to user interface 111 of FIG. 1. As described below, client device 105 may use the GUI for implementing local business application 109. To this end, the GUI may include interfaces for modeling a process, administering processes, processing user business process tasks associated with BPMS environment 103 and/or local business application 109, monitoring processes, or analyzing processes. As will be appreciated by those of ordinary skill in the art, these GUIs may be implemented using various technologies, such as asynchronous JavaScript and XML in conjunction with dynamic HTML(Ajax).

Archive data 202 may include Information for creating an instance of software applications necessary to provide a BPMS environment corresponding to BPMS environment 103. For example, archive data 202 may include information for creating an instance of a BPMS stack including the various components needed to provide BPMS environment 103. Archive data 202 may allow instances of the necessary software applications (e.g., components) to be provided without directly installing BPMS software on a client device.

Figure 3:
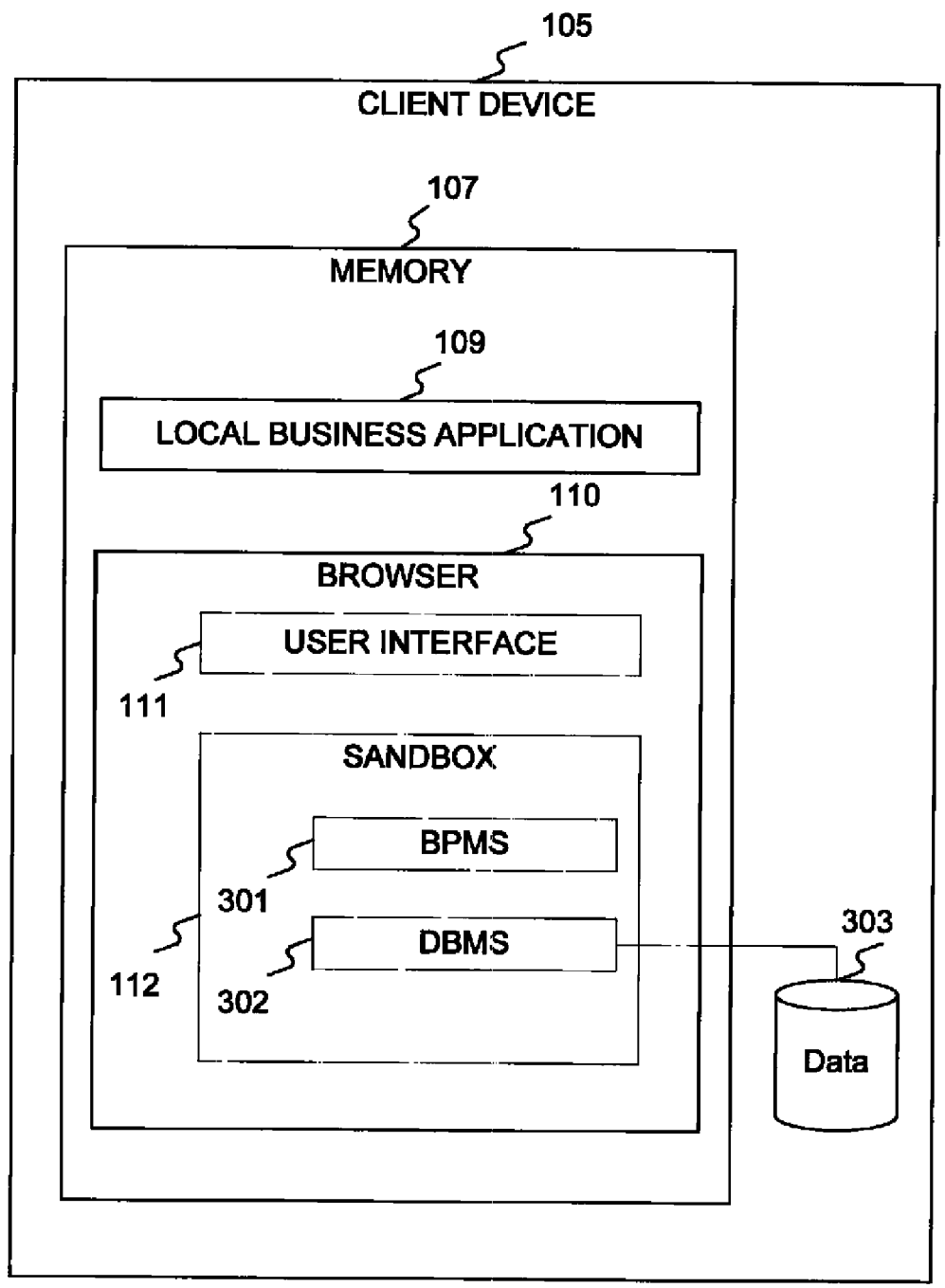
FIG. 3 illustrates an exemplary client device for implementing an instance of a BPMS system, consistent with the present invention.

FIG. 3 depicts an exemplary client device 105 providing an instance of BPMS environment 103. For example, FIG. 3 may depict the state of client device 105 after receiving front-end data 201 and archive data 202, as depicted in FIG. 2. In this state, client device 105 may provide an instance of the BPMS stack that includes components such as a BPMS instance 301 and an instance of a database management system (DBMS) 302 in sandbox 112. Client device 105 may create the BPMS stack using bootstrapping. Bootstrapping is a process by which a simple program is used to load, configure, and/or run more complex programs. In the example above, archive data 202 may include a simple program that loads and configures the BPMS stack. Client device 105 may implement the BPMS stack using, for example, Java. In that example, client device 105 may implement the BPMS stack using a Java Enterprise Edition ("JEE") engine (not shown), and the BPMS stack may contain a dedicated BPMS instance 301. Archive data 202 may include a set of archive files (e.g., Java Archive ("jar") files) for implementing the JEE engine. The dependency chain of archive data 202 may indirectly specify the order in which the archive files may be started while bootstrapping the BPMS stack. Client device 105 may also provide a dynamic downloading facility that may download components of the BPMS stack from web server 102 when they are needed (e.g. during start up of the BPMS instance 301).

As described above, archive data 202 may include the necessary information for generating BPMS instance 301. When the BPMS stack is implemented using Java, the JEE engine may run BPMS instance 301 as a JEE service controlled by the JEE engine's lifecycle management. In this embodiment, archive data 202 may include one or more jar files for implementing BPMS instance 301. As discussed above, the jar files providing the implementation for BPMS instance 301 may depend on some infrastructure and may depend on some components of a JEE server which may have been provided in other jar files of archive data 202.

In systems consistent with the invention, starting a BPMS instance 301 in sandbox 112 may be similar to starting a BPMS instance in a non-sandboxed environment. After being started in sandbox 112, BPMS instance 301 may be visible to client device 105 as if it was running on a separate device. Additionally, client device 105 may not actually install anything locally. BPMS instance 301 may, in fact, be installed within the archive 202 and started once the archive 202 is received.

Similar to BPMS instance 301, DBMS instance 302 may also be an instance of a DBMS for providing the preconfigured and prepackaged BPMS environment 103 depicted in FIG. 1. In exemplary implementations, the information for generating DBMS instance 302 may have been included in archive data 202. When the BPMS stack is implemented using Java, the JEE engine may run DBMS instance 302 as a JEE service which is controlled by the JEE engines lifecycle management. In this embodiment, archive data 202 may include one or more jar files for implementing DBMS instance 302. As discussed above, the jar files providing the implementation for DBMS instance 302 may depend on some infrastructure and may depend on some components of a JEE server which may have been provided in other jar files of archive data 202.

Starting a DBMS instance 302 in a sandbox 112 may also be similar to starting a DBMS instance in a non-sandboxed environment. After being started in sandbox 112, DBMS 302 may be visible to client device 105 as if it was running on a separate device. Additionally, DBMS instance 301 may be installed within archive 202 and merely started. DBMS instance 302 may be associated with or manage the data of database 303 of client device 105. As shown in FIG. 3, database 303 may be a part of memory 107. However, database 303 may be implemented by a separate memory device. DBMS 302 may thus, for instance, control the creation, maintenance, and use of databases 303 storing data associated with DBMS instance 302. For failover purposes, DBMS 302 may use the hard disks of client device 101A and 105 to store BPMS runtime data for BPMS instance 301 (e.g., the state of the running process instances).

In exemplary implementations, DBMS instance 302 may include an instance of lightweight DBMS, such as SQLite, or Apache Derby. Optionally, database 303 may be replicated on the databases of other client devices of system 100. This may improve the failover of system 100 if client 105 crashes or loses connection to a client device 101A participating in a distributed process of BPMS instance 301. Client device 101A may then recover the affected processes from the replicated or centralized data. By replicating database 303 to other client devices of system 100, multiple users may modify business process data stored in database 303. System 100 may replicate database 303 by using, for example, technologies similar to redundant arrays of independent disks. For example, system 100 may replicate the data of database 303 of client device 105 on the local memories of other client devices, such as client device 101A. Alternatively, DBMS instance 302 may store data on a central database of a client network 101B. Additionally, DBMS instance 302 may manage data included in archive 202 received from web server 102. For example, DBMS instance 302 may include static data for BPMS instance 301 from archive 202, such as process definitions and configurations. DBMS instance 302 may also include dynamic data including state information for BPMS instance 301.

Systems 100 consistent with the invention may thus provide several advantages in implementing a BPMS environment 103. For example, system 100 may allow for increased data privacy, which may be necessary if web server 102 is owned by a third-party. For example, by storing data in local memory 107, rather than at web server 103, system 100 may maintain the privacy of the data stored in database 303. Accordingly, storing data in local memory 107 may limit the third-party's ability to access the data. System 100 may keep all confidential data (e.g., process definitions, instance data) local to client devices 105 and 101A at all times, such that the service provider merely offers pre-configured archive data 202 (containing the BPMS instance 301 and DBMS instance 302 and non-confidential configuration data). In systems consistent with the invention, database 303 and DBMS instance 302 may thus store various types of business process data in client device 105. For example, database 303 may store business process models, data for managing BPMS processes, or business process task information. Business process models themselves may be an assembly of different types of information, including control flow specifications, data mapping, interface descriptions for interacting with other business systems, user task definitions, user interface specifications, role definitions, or user-defined process extensions (e.g., custom code snippets incorporated into a process model to allow for user-defined extensions). For process instance data, DBMS instance 302 may store state information of a process instance in sync with the current state of execution of the process instance. Such state information may include the process instance's data context (e.g., populated variables holding data for BPMS instance 301), role assignments (e.g., task processors), or instruction pointers. Portions of database 303 may be populated from archive 202 depicted in FIG. 2 (e.g., "shipped" content such as pre-packaged process definitions that are ready to be used). Client device 105 may then add additional data to database 303 over time, as described above. For example, the data of database 303 may have been created by a user via user interface 111 and then stored in database 303 through use of DBMS instance 302.

Systems 100 consistent with the invention may also prevent bottlenecks in accessing data. For example, system 100 may prevent bottlenecks by providing, at client device 105, the local instance BPMS 301, the local instance DBMS 302, and the local storage of BPMS data in database 303. Client device 105 may thus access business process data locally without making a separate request to web server 102. This may limit the need for data locking and consistency procedures, which a web server may otherwise need to perform when storing data requested by client devices. Additionally, using local storage to store data may also reduce the latencies in retrieving the data. Furthermore, in systems consistent with the invention, DBMS instance 302 may not need to rely upon the shared resources of web server 102. In contrast, a typical on-demand BPMS environment may require data requests from a client device to be queued until the requested data is unlocked or sufficient resources are available on a central server of a third-party service provider to process the request.

Systems 100 consistent with the invention may also allow for use of client device's 105 own resources for implementing BPMS environment 103. More specifically, by running BPMS instance 301 and DBMS instance 302, the resources of client device 105 may be used to provide BPMS environment 103 instead of the remote resources of a third-party web server 102. Accordingly, web server 102 may be easily scaled to serve additional clients. Furthermore, these client resources may be used without directly installing BPMS software on client device 105. For example, the entire BPMS system may be pre-packaged in archive 202 and automatically bootstrapped in sandbox 112.

Figure 4:
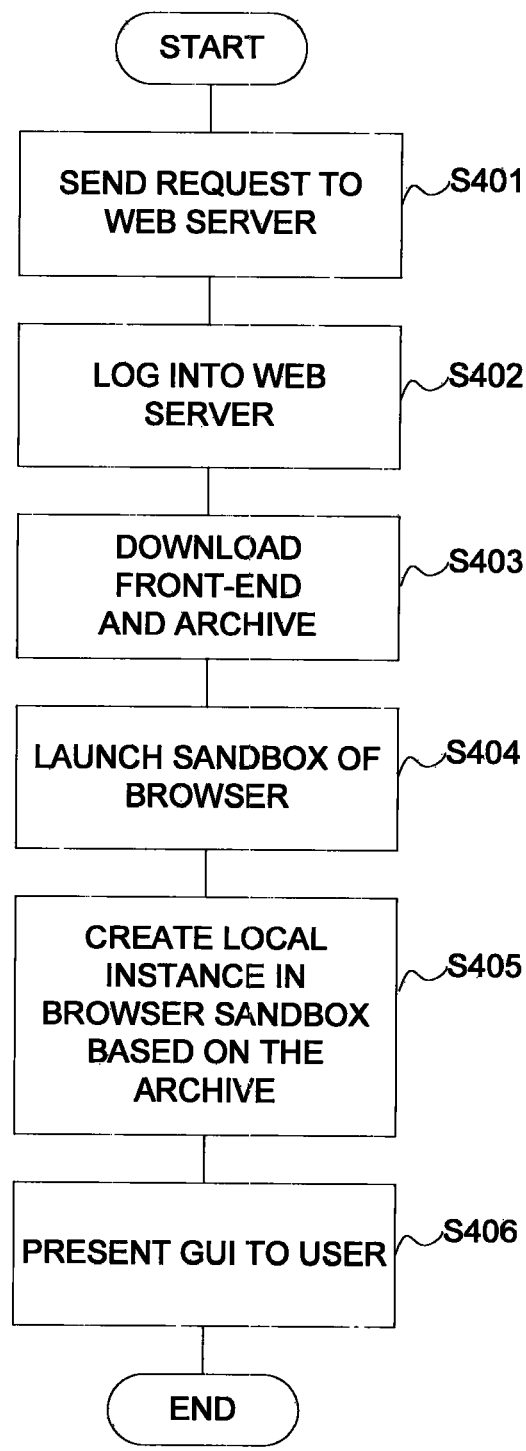
FIG. 4 illustrates an exemplary process for providing a BPMS environment, consistent with the present invention.

FIG. 4 illustrates an exemplary process for providing a BPMS environment. As shown in FIG. 4, client device 105 may send to web server 102 a request to launch a BPMS environment 103 (stage S401). Client device 105 may then log into web server 102 (stage S402) and download, from web server 102, front-end data 201 for providing a user interface 111 and archive data 202 for providing a BPMS stack including a BPMS instance 301 and a DBMS instance 302 (stage S403).

Client device 105 may then launch sandbox 112 of browser 110 (stage S404). As described above, sandbox 112 may provide an environment for providing instances of software necessary for providing a BPMS environment. Indeed, sandbox 112 may be an abstraction of client device 105's operating system by providing some basic infrastructure service. Archive data 202 may entirely contain the BPMS stack from which client device 105 may bootstrap the BPMS stack in sandbox 112. Client device 150 may then create or instantiate a BPMS instance 301 and DBMS instance 302 (stage S405). Using front-end data 201, client device 105 may then present a GUI, such as user interface 111 to a user of client device 105 via a display device (stage S406). The GUI may be presented to a user in a window of browser 111. The GUI provides an interface that allows the user to interact with instances of software in sandbox 112 such as BPMS instance 301 and DBMS instance 302.

The GUI presented in stage 5406 may include an Ajax-based process modeling environment. The Ajax-based process modeling environment may provide a client-side web application using a client-side scripting language such as JavaScript, VBScript, or Adobe Flex. The Ajax-based process modeling environment may further employ HTML, DHTML, XHTML, and/or CSS for presenting the information in browser 111. Additionally, the Ajax-based process modeling environment may employ a Document Object Model (DOM) for the dynamic display and interaction with data. Furthermore, the Ajax-based process modeling environment may employ XML and XSLT for the interchange, and manipulation and display, of data, respectively. The GUI may be based on standard web technologies for presenting the above types of user interfaces. In other words, the BPMS stack may include a mini web server that hosts a number of HTML pages, which may include JavaScript and/or AJAX components. Browser 110 may then open those pages. As part of the bootstrapping phase, browser 110 may re-direct to the page(s) hosted on client device 105. Database 303 may store the business process models created or manipulated by the GUI presented in stage S406. Furthermore, information for creating or instantiating DBMS instance 302 included in archive 202 downloaded from web server 102 in stage S403 may include the business process models. Alternatively, a user of client device 105 may create the business process models using the GUI presented in stage S406.

Additionally, the GUI presented in stage S406 may include a GUI administering business processes based on the business process models stored in database 303. For example, client device 105 may provide an Ajax-based environment for process administration and provide this environment to the user via browser 110.

BPMS instance 301 may also manage business process tasks. For example, BPMS instance 301 may process business process tasks from local business application 109. Local business application 109 may include a implementation of a BPMS, such as SAP NetWeaver BPM To access these business process tasks, BPMS instance 301 may use a local call or web service call to a local business application 109. Local calls and web service calls provide a mechanism to break out of sandbox 112 such that instances of software in sandbox 112 can communicate with local applications or operating system 108 of client device 105. The web services may also rely on web technologies which sandbox 112 may permit as part of sandbox 112's security policies.

Business processes modeled by BPMS instance 301 may include tasks or steps performed by different persons. However, some persons needed to perform a modeled process may not have access to client device 105. Accordingly, system 100 may distribute the business process tasks necessary to complete the steps of a modeled business process stored in database 303. An exemplary modeled business process stored in database 303 may, for example, require a user of client device 105 to seek supervisory approval before the user can proceed to a next step of the business process. BPMS instance 301 may route business process tasks in an "off-line" manner by using services such as e-mail or an on-line collaboration platform. An on-line collaboration platforms may include, for example, MS Sharepoint, Lotus Notes, or Google Wave. These business process tasks are routed "off-line" because the business process task routing and processing is handled by a service external to sandbox 112. Alternatively, the business process tasks may be routed "on-line," using a task management component built into the BPMS environment 103 that uses an instance of a web server within sandbox 112 to host html pages.

Figure 5:
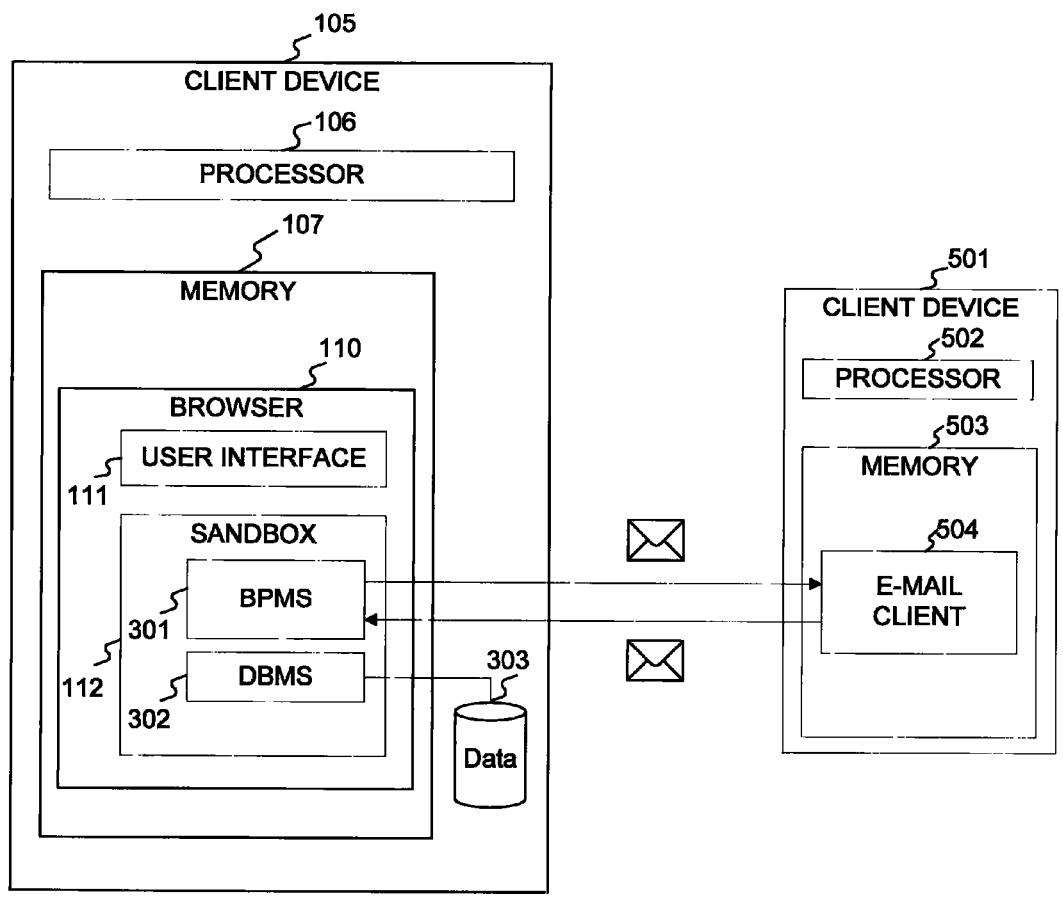
FIG. 5 illustrates an exemplary system for implementing a process for managing business process tasks in an off-line manner using e-mail, consistent with the present invention.

FIG. 5 illustrates an exemplary system for implementing a process for managing business process tasks in an off-line manner using e-mail. As shown in FIG. 5, client device 105 may maintain a BPMS instance 301 in sandbox 112. In one implementation consistent with the invention, client device 105 may originate an e-mail message that it then sends to a client device 501 associated with one or more persons assigned to the particular business process task. In the context of the exemplary modeled business process, this may be an e-mail sent from the user's client device 105 to client device 501 of the supervisor.

As shown in FIG. 5, client device 501 may include a processor 502 and a memory 503. Memory 503 may include instructions for providing an e-mail client 504, when the instructions are executed by processor 502. E-mail client 504 may receive the e-mail message from client device 105 and send a reply message to client device 105. E-mail messages may be communicated using one or more e-mail servers (not shown). Client device 105 may also include an e-mail client (not shown) for sending the e-mail message and receiving the reply message. The e-mail clients may be implemented, for example, by Microsoft Outlook, IBM's Lotus Notes, or Mozilla Thunderbird.

Figure 6:
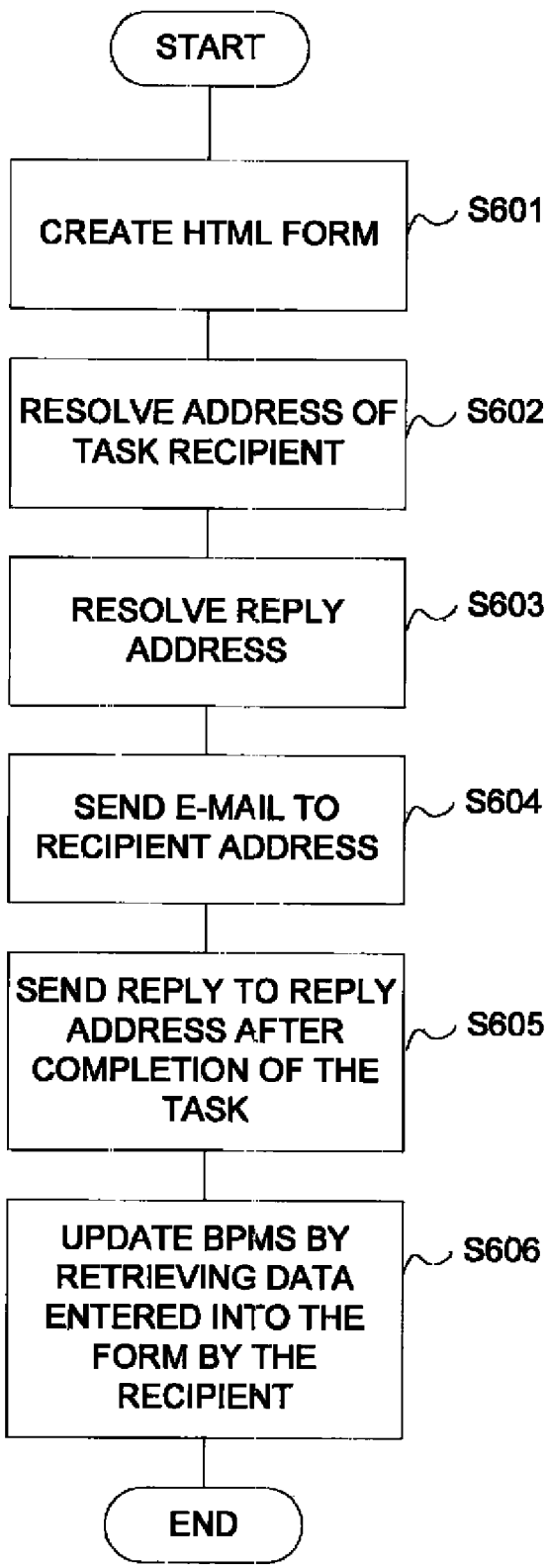
FIG. 6 illustrates an exemplary process for managing business process tasks in an off-line manner using e-mail, consistent with the present invention.

FIG. 6 depicts an exemplary process for managing business process tasks in an off line manner using e-mail messages. As shown in FIG. 6, a user of client device 105 may create a form for managing a particular business process task (stage S601). Client device 105 may generate the form using a mark-up language (e.g., HTML) or using the xforms W3C standard and predefined business process task information generated from a business process model stored in database 303. In the context of the exemplary modeled business process, this may be generating an html form including information regarding the transaction that needs approval and the element permitting the supervisor to indicate approval or disapproval.

Client device 105 or BPMS instance 301 may then resolve an e-mail address of one or more persons assigned to the business process task (stage S602). BPMS instance 301 may automatically resolve the e-mail address using, for example, data of database 303. Alternatively, BPMS instance 301 may resolve the e-mail address using instructions stored in the process model and consulting a local human resources application which my run on client device 105 or at a separate location. For example, a human resources system may provide a web service "getSuperior" which retrieves the manager (and his/her email address) from a given employee name (e.g., the person who has started the process on client device 105). In the context of the exemplary modeled business process, this may including looking up an e-mail address of the user's supervisor in, for example, an address book or human resources database.

Client device 105 or BPMS instance 301 may then resolve a reply-to e-mail address of one or more persons assigned to the business process task (stage S603). BPMS instance 301 may automatically resolve the e-mail address using, for example, data of database 303. Automatically resolving the reply e-mail address may include, for example, generating a reply e-mail address for the business process task.

Client device 105 may then transmit an e-mail message identifying the particular business process task to the resolved e-mail address (stage S604). After the business process task is completed, a user of client device 501 may use e-mail client 504 to send a reply e-mail to the reply e-mail address (stage S605). In the context of the exemplary modeled business process, this may include the supervisor receiving an e-mail including the form, the supervisor updating the form to indicate approval or disapproval, and sending the updated html form to the reply e-mail address. Then, BPMS instance 301 may update the business process. For example, BPMS instance 301 may include business processes that may act upon "events" (e.g., an incoming email). When the business process receives that event (which the business process may be waiting for), client device 105 may extract the form's content (e.g., the data that was entered by the supervisor) and copy the content to a process data context, using data mapping instructions of a process model for the business process.

Figure 7:
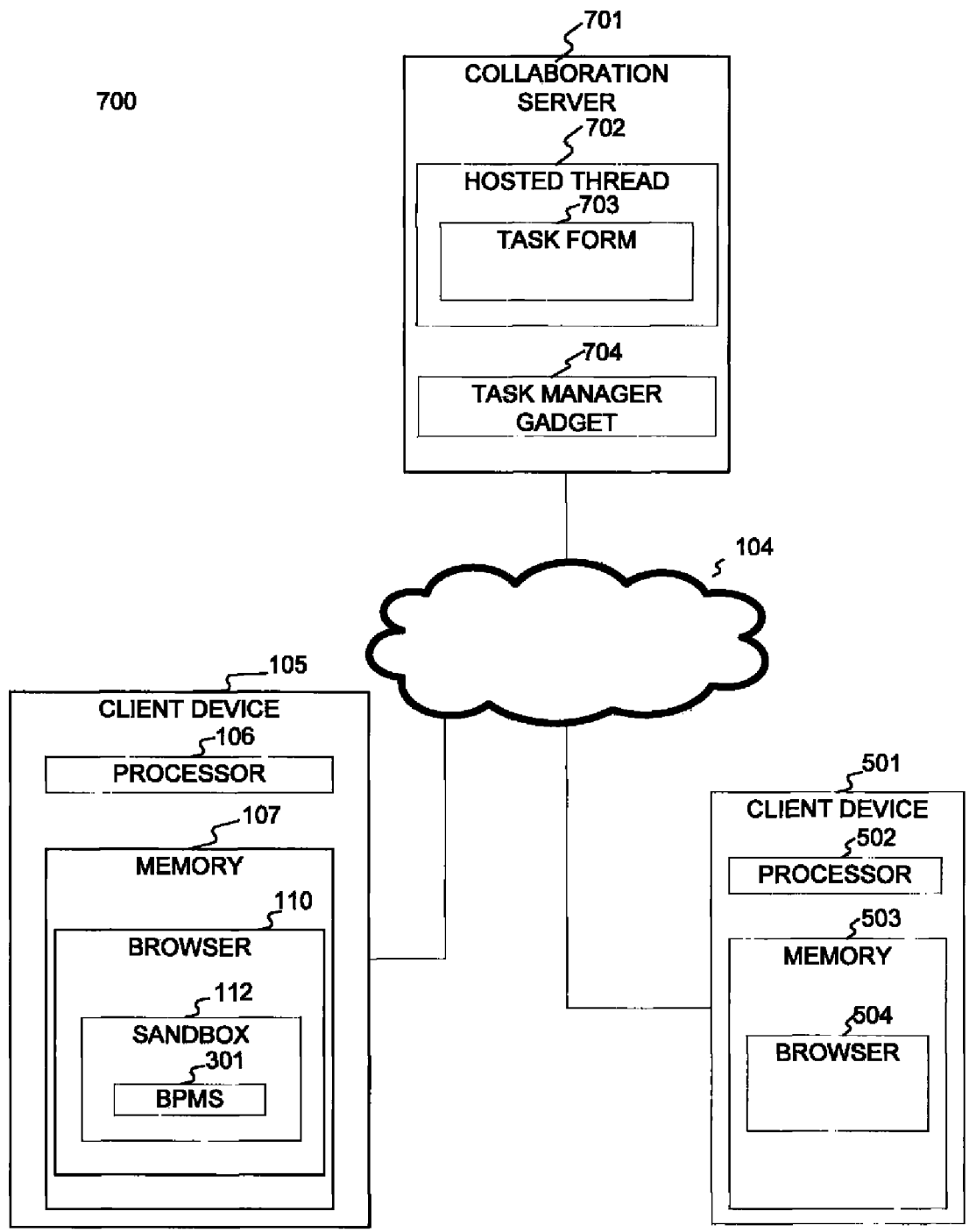
FIG. 7 illustrates an exemplary system for implementing a process for managing business process tasks in an off-line manner using a hosted conversation thread, consistent with the present invention.

FIG. 7 depicts an exemplary system 700 for managing business process tasks in an offline manner using a hosted thread provided by an on-line collaboration tool, such as Google Wave. As shown in FIG. 7, system 700 may include client device 105 that provides BPMS instance 301. System 700 may further include a collaboration server 701 for hosting conversation threads and providing access for users to interact with the hosted threads. Collaboration server 701 may further include a hosted thread 702 having a business process task form 703. Collaboration server 701 may also include a business process task manager gadget 704. Additionally, collaboration server 701 may include a web server (not shown) for serving a webpage for accessing hosted thread 702. System 700 may further include a client device 501 of a person or persons assigned to a business process task. As discussed above, client device 501 may include a processor 502 and a memory 503. In system 700, client device 501 may further include a browser 504.

Figure 8:
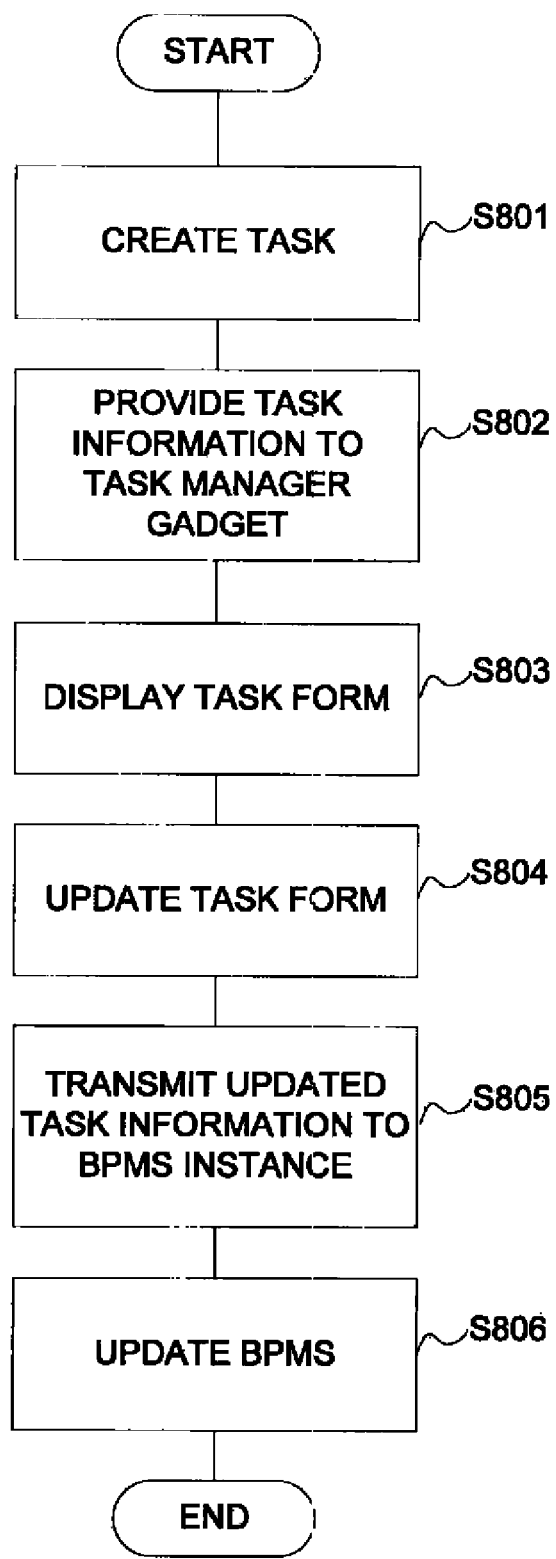
FIG. 8 illustrates an exemplary process for managing business process tasks in an off-line manner using a hosted thread, consistent with the present invention.

FIG. 8 shows an exemplary process for managing a business process task using a hosted thread provided by an on-line collaboration tool, such as Google Wave. As shown in FIG. 8, BPMS instance 301 of client device 105 may create a business process task based on a business process model stored in database 303 (stage S801). Then, client device 105 may provide business process task information to a business process task manager gadget 704 (stage S802). The business process task information that client device may provide may include, for example, information regarding a transaction or a business process task and an indication of the action to be performed by the recipient. Business process task manager gadget 704 may then provide the business process task information in a business process task form 703 included in a hosted thread 702 (stage S803). In the context of the exemplary modeled business process, this may include creating a form with including information regarding the transaction needing approval and element permitting the supervisor to indicate approval or disapproval in a hosted thread that the user's supervisor is a member of.

The person assigned to the business process task may then view business process task form 703 in hosted thread 702. The person may view business process task form 703 and hosted thread 703 by, for example, using browser 504 of client device 501. Browser 504 may provide hosted thread 702 and business process task form 703 when the person enters into browser 504 a URL for a web page providing an interface for viewing host thread 702 and business process task form 703. The person assigned to the business process task may be a member of hosted thread 702 containing business process task form 703. In the context of the exemplary modeled business process, this may include the supervisor receiving an indication that a thread has been updated and then logging into a website of collaboration server 701 to view the thread.

After completing the business process task, the person assigned to the business process task may update business process task form 703 in thread 702 (stage S804). The business process task may be updated using browser 504 and the web page provided by collaboration server 701. Client device 105 may then receive the updated business process task information and provide the updated business process task information to BPMS instance 301 (stage S805). BPMS instance 301 may then update the data on the state of a modeled business process of database 303 based on the updated business process task information (stage S806). BPMS instance 301 may update the business process data of database 303 using DBMS instance 302. In the exemplary modeled business process, this may include the supervisor updating the form in the hosted thread and the database 303 being updated to reflect the supervisors approval or disapproval.

Figure 9:
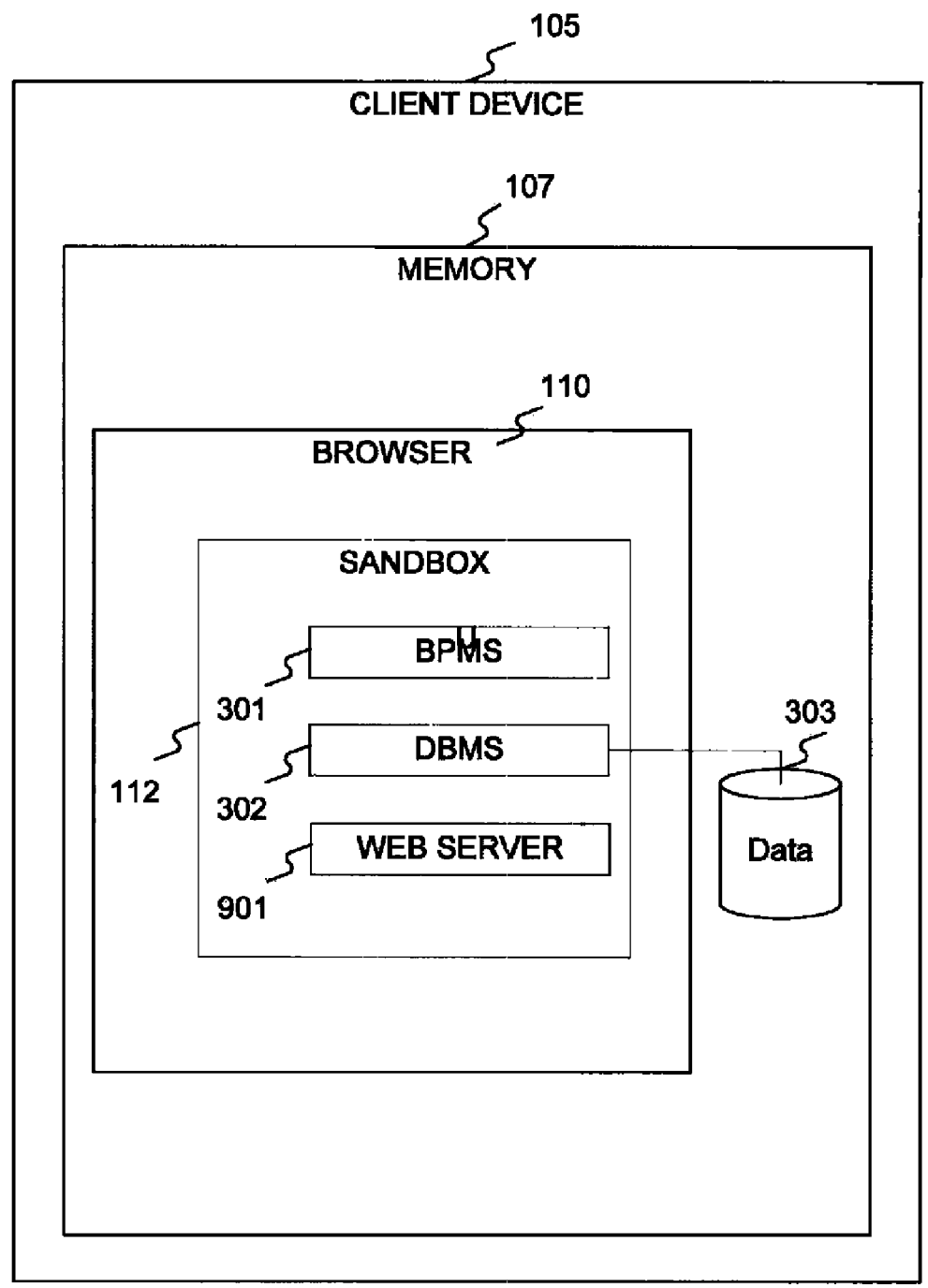
FIG. 9 illustrates an exemplary system for implementing a process for managing business process tasks in an on-line manner, consistent with the present invention.

FIG. 9 depicts an exemplary client for managing business process tasks in an on-line manner. As shown in FIG. 9, client device 105 may include a memory 107, a BPMS instance 301, a DBMS instance 302, and database 303. As shown in FIG. 9, client device 105 may include an instance of a web server 901 in sandbox 112. The web server 901 may be a light weight web server such as Apache Tomcat, Jetty, etc. Web server 901 may also provide HTML pages for modeling, administration of the business processes.

Figure 10:
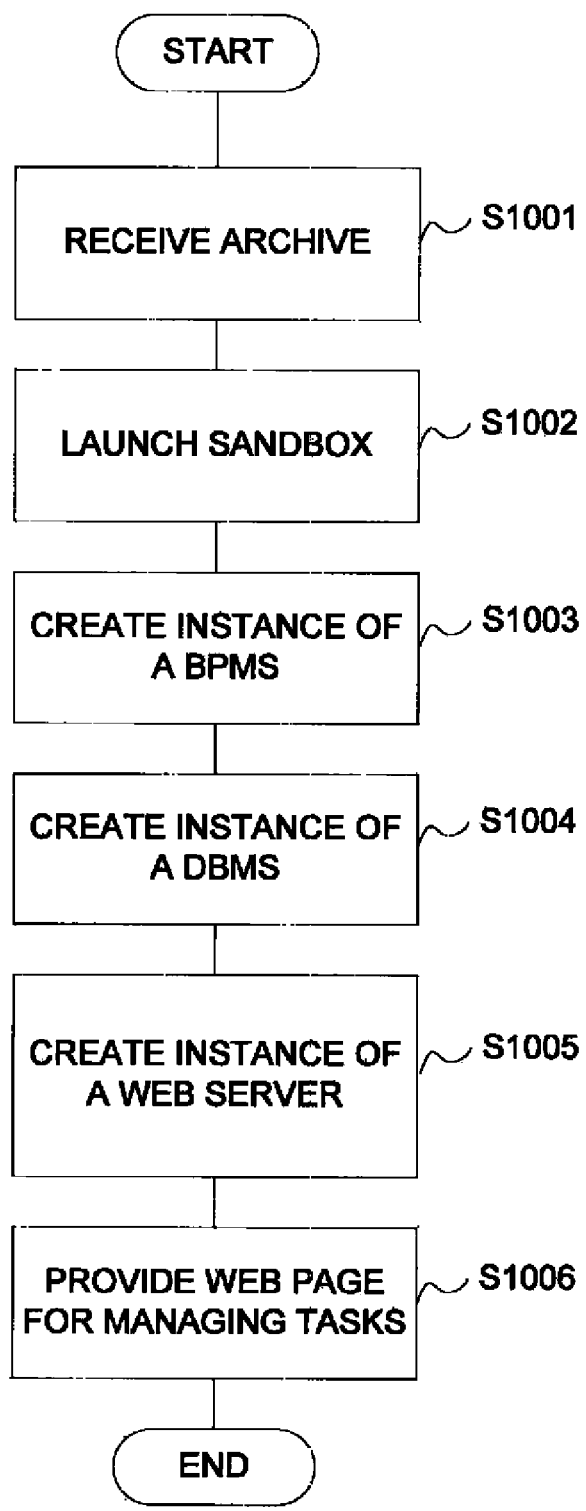
FIG. 10. illustrates an exemplary process for managing business process tasks in an on-line manner, consistent with the present invention.

FIG. 10 illustrates an exemplary process for managing business process tasks in an on-line manner. As shown in FIG. 10, client device 105 may receive an archive 202 from a web server 102 (stage S1001). Client device 105 may then launch a sandbox 112 in browser 110 (stage S1002). Next, client device 105 may create or instantiate an instance of a BPMS 301 (stage S1003). Client device 105 may then create or instantiate an instance of a DBMS 302 (stage S1004). Client device 105 may also create or instantiate an instance of a web server 901 (stage S1005). Then, web server 901 may provide a web page for managing business process tasks (stage S1006). A person assigned to the business process task may view the web page using browser 504 of client device 501. The web page may provide HTML forms for providing business process task information to the person assigned to the business process task. The web page may further include a GUI for viewing and managing business process tasks. Then, business process tasks may be viewed and updated, and the BPMS instance 301 can be updated.

The foregoing description of possible implementations consistent with the present invention does not represent a comprehensive list of all such implementations or all variations of the implementations described. The description of only some implementations should not be construed as an intent to exclude other implementations. One of ordinary skill in the art, will understand how to implement the invention in the appended claims in many other ways, using equivalents and alternatives that do not depart from the scope of the following claims.

The systems and methods disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instructions or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in many other ways, using equivalents and alternatives that do not depart from the scope of the following claims.

What is claimed is:

1. A computer-implemented method for managing a business process, the method comprising:
    receiving a request from a client device;
    sending, to the client device, an archive including information for instantiating a business process management application and instantiating a database management system, the archive further comprising information for creating an instance of a web server in a sandbox, wherein the web server hosts a web page for managing business process tasks;
    sending, to the client device, front-end data including data for providing a graphical user interface for the business process management application; and
    providing, to the client device, the graphical user interface for the business process management application to be displayed by a browser of the client device.

2. The computer-implemented method of claim 1, wherein the sent archive allows instances of the business process management application to be provided without directly installing software for the business process management application on the client device.

3. The computer-implemented method of claim 1, wherein the archive includes information for interfacing with a local business application of the client device.

4. The computer-implemented method of claim 1, wherein the information for creating the instance of the business process management application includes instructions for:
    creating a form for a business process task;
    resolving an address of a business process task recipient;
    resolving an reply address; and
    sending an e-mail including the html form to the address of the business process task recipient.

5. The computer implemented method of claim 4, wherein the information for creating the instance of the business process management application includes instructions for:
    receiving a reply e-mail from the business process task recipient; and
    updating business process management data based on the reply e-mail.

6. The computer implemented method of claim 1, wherein the information for creating the instance of the business process management application includes instructions for:
    sending business process task information to a business process task manager gadget for displaying a business process task form in a hosted thread;
    receiving updated business process task information based on updates to the business process task form in the hosted thread; and
    updating business process management data based on the updated business process task information.

7. A web server for providing an environment for managing a business process on a client device, the web server comprising:
    a processor;
    a receiver for receiving a request from a client device;
    a transmitter for sending data to a client device over a network including an archive, wherein the archive includes information for instantiating a business process management application, instantiating a database management system, instantiating a web server, and front-end data for providing a graphical user interface for the business process management application; and
    a memory for storing the archive and the front end data, wherein sending data to the client device causes the graphical user interface to be presented and causes the business process management application the web server and the database management system to be instantiated in a sandbox of the client device.

8. The web server of claim 7, wherein the archive allows instances of the business process management application to be provided without directly installing software for the business process management application on the client device.

9. The computer-implemented method of claim 7, wherein the archive includes information for interfacing with a local business application of the client device.

10. The web server of claim 7, wherein the archive includes a business process model.

11. The web server of claim 7, wherein the archive includes information for instantiating a lightweight web server in the sandbox of the client device.

12. The web server of claim 7, wherein the archive includes information for creating a local database on the client device.

13. The web server of claim 11, wherein the archive includes information for replicating a local database created on the client device.

14. A client device for providing a business process management application, the device comprising:
    a processor;
    a transmitter for sending a request to a web server;
    a receiver for receiving an archive including front-end data from the web server; and
    a memory for storing instructions to execute a method, the method comprising:
    launching a sandbox on the client device,
    creating an instance of the business process management application based on the archive received from the web server, creating an instance of a local web server in the sandbox, wherein the local web server hosts a web page for managing business process tasks creating an instance of a database management system in the sandbox, and providing a graphical user interface for the business process management application in a browser of the client device.

15. The client device of claim 14, the client device further comprises:

a local business application installed on the client device for providing business processes or interacting with business processes.

16. The client device of claim 14, wherein the method further comprises:

creating an html form for a business process task;
resolving an address of a business process task recipient;
resolving an reply address; and
sending an e-mail including the html form to the address of the business process task recipient.

17. The client device of claim 14, wherein the method further comprises:

receiving a reply e-mail from the business process task recipient; and updating business process management suite data based on the reply e-mail.

18. The client device of claim 14, wherein the method further comprises:

sending business process task information to a business process task manager gadget for displaying a business process task form in a hosted thread;

receiving updated business process task information based on updates to the business process task form in the hosted thread; and updating business process management suite data based on the updated business process task information.

19. The client device of claim 14 further comprising an instance of a lightweight web server in the sandbox for hosting a web page for managing business process tasks.

* * * * *